United States Patent

Miyamoto et al.

[15] 3,687,592
[45] Aug. 29, 1972

[54] APPARATUS FOR PRODUCING THERMOPLASTIC SYNTHETIC RESIN FOAMED PRODUCTS

[72] Inventors: Akira Miyamoto, Shinomiya; Hiroyuki, Tamura, both of, Hiratsukashi, Japan

[73] Assignee: Mitsutishi Gas Chemical Company, Inc., Tokyo, Japan

[22] Filed: Nov. 24, 1969

[21] Appl. No.: 879,431

[30] Foreign Application Priority Data

Nov. 24, 1969 Japan .....................43/85553

[52] U.S. Cl. .....................425/376, 425/461, 425/4
[51] Int. Cl. .....................B29d 27/00, B29f 3/01
[58] Field of Search ......18/12 D, 12 M, 12 DS, 12 R, 18/12 DV, 12 F, 13 D, 13 S, 13 T, 14 T, 14 V, 5 P; 25/11, 12, 13; 164/281, 89; 118/401, DIG. 4; 425/376, 461, 4

[56] References Cited

UNITED STATES PATENTS

| 2,977,929 | 4/1961 | Whitehurst et al. ........118/401 |
| 3,463,220 | 8/1969 | Moritz....................164/89 X |
| 3,001,507 | 9/1961 | Whitehurst et al. ........118/401 |

*Primary Examiner*—J. Spencer Overholser
*Assistant Examiner*—Norman E. Lehrer
*Attorney*—Clario Ceccon

[57] ABSTRACT

The present disclosure relates to a method and an apparatus for the continuous production of wide and thick plates or sheets of foamed products of foamable molten compositions of thermoplastic synthetic resins containing foaming agents. In carrying out the production of these foams, there are provided dies with a continuous slit and with a number of projections with predetermined intervals on both sides of the slit, in such a manner that concave and convex lips are obtained at the outlet, and the foamable resin is extruded from said dies to produce relatively thick plates or sheets of foamed material.

6 Claims, 6 Drawing Figures

APPARATUS FOR PRODUCING THERMOPLASTIC SYNTHETIC RESIN FOAMED PRODUCTS

FIELD OF INVENTION

The present invention relates to a method for the production of foamed products by extrusion of foamable molten compositions consisting of thermoplastic synthetic resins and foaming agents and, more particularly, it relates to a method for the continuous production of thick, wide foamed sheets or plates of low density

THE PRIOR ART

In accordance with conventional methods for the production of thick plate shaped foamed products of thermoplastic synthetic resin, the resin containing suitable foaming agent is usually thermally shaped in molds.

However, the operation cannot be carried out continuously and the productivity thereof is generally poor, and at the same time very difficult when longer and relatively thicker foamed sheets or plates are desired.

In another known method, relatively thicker plates of foamed thermoplastic synthetic resin are obtained by extrusion processes. A die with narrow slits is provided at the end of the extruder, and a shaping guide is set on the end of the die, and the foamable thermoplastic synthetic resin composition is extruded from the narrow slits. The extruded foamed products are melt-adhered to one another in the shaping guide while the surfaces of the foamed products are still soft, to produce foamed sheets or plates.

However, the long plates obtained by such a method are easily cracked with ensuing peeling off of adhered portions when a bending force is applied.

SUMMARY OF THE INVENTION

The object of the present invention is to provide a method for the continuous production of thick and wide sheets or plates of foamed materials of low density from the foamable molten composition of thermoplastic synthetic resins containing foaming agents.

Another object of the present invention is to provide special dies for the extruder for the continuous production of thick and wide foamed sheets or plates of low density.

Another object of the present invention is to provide thick and wide foamed sheets or plates of low density wherein the melt-adhered portion of the foamed product is minimal while the intermediate layers of the foamed product are perfectly homogeneous and continuous, so as to result in a united surface.

DESCRIPTION OF THE DRAWINGS

The objects and advantages of the present invention will become more apparent from the following detailed description and examples and from the accompanying drawings, in which.

DETAILED DESCRIPTION OF THE INVENTION

Figure 1:
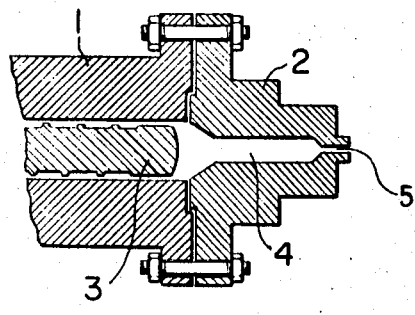
FIG. 1 is a cross-sectional side view of the extruder at the end of which the die of the present invention is provided.

It is well known to those skilled in the art, that the foamed product is obtained when a foamable thermoplastic synthetic resin composition containing foaming agent is melted within an extruder, and then extruded through dies to a lower pressure zone. Even when the dies on the end of the extruder are conventional ones, such as T dies, a very small slit clearance leads to a low density foamed product, but the thickness thereof is limited and relatively small, and corrugations are produced in the transverse direction of the sheet, so that it is not possible to obtain satisfactorily thick and wide plates or sheets.

On the other hand, when the slit clearance is increased to produce thicker foamed products, the density of the foam obtained is abruptly augmented and, at the same time, the size and/or distribution of the foam cells becomes irregular and the surface of the product is coarse.

Generally speaking, when a foamed thermoplastic synthetic resin product is produced by extrusion of the foamable thermoplastic synthetic resin from a high pressure zone to a lower pressure zone, the degree of expansion increases when the pressure difference and/or the rate of the pressure drop ($dp/dt$) is larger, so that a foamed product of uniform cell structure can be obtained. In the above mentioned case, when the slit clearance of the T die is narrow, the pressure inside the die is kept high and, as a result, the degree of expansion increases and a foamed product of low density can be obtained.

However, the foamable molten composition of thermoplastic synthetic resin begins to expand immediately after it passes through the die lip, the expansion occurring in all three dimensional directions. Therefore, when the clearance of the slit of the die is narrow, the thickness of the foamed product decreases.

When a wide-surfaced foamed product is desired, the most difficult problem encountered is the one relating to the expansion of the sheet in the transverse, i.e., non-longitudinal, direction.

The growth of the extruded product longitudinally or in depth does not offer a problem, because the longitudinal expansion can be corrected by adjusting the take up speed, while the thickness of the sheets is fundamentally relatively small. On the other hand, the width of the sheet is originally relatively large and will expand by a factor of three; however, it is being concurrently cooled and solidified during the expansion process with consequent formation of corrugations.

When the slit clearance is enlarged, in an attempt to produce a foamed product of large thickness, the pressure inside the die is lowered, and expansion rate is insufficient and, therefore, it becomes difficult to produce a foamed product of low density.

The pressure loss caused while the molten composition is within the extruder passes through the slit of two parallel plates and is inversely proportional to the third power of the slit clearance, assuming the fluid to be a Newtonian fluid. Slight changes of the slit clearance of the die affects considerably the pressure inside the die.

On the other hand, when the slit clearance is increased, the difference in the extruding speed of the central and peripheral portions of the slit is considerable. The foam on the peripheral portion is broken during the extruding process and, as a result, it is difficult to produce a uniformly foamed product.

In order to retain the required high internal pressure in the die, which has a slit with a relatively enlarged clearance, it was considered to lengthen the surface of the slit. However, when the surface is excessively lengthened, the rate of pressure drop during the extrusion decreases and, as a result, a foamed product of high density and unsatisfactory appearance is obtained.

Concluding, when molten foamable thermoplastic synthetic resins are extruded and foamed by using dies with ordinary slits, it is difficult to produce thick sheets or plates of low density.

In accordance with the present invention, a molten thermoplastic synthetic resin containing a foaming agent is extruded through a die having a continuous slit and a number of projections with predetermined intervals on both sides of the slit, in such a manner that convex and concave lips are shaped on the low pressure side, and foamed products of low density can be produced.

As to said projections, a number of projections can be arranged with predetermined intervals, in such a manner that, whether convex and concave lips correspond to one another or not, the length of each projection does not change.

The foamed product obtained by using the die of the present invention is such that it is only partly melt-adhered under expansion pressure and has a homogeneous and united surface.

The melt-adhered portions of the foamed product obtained are minimal and the intermediate layers are uniformly and completely united, so that they cannot be easily divided by application of bending forces or the like.

The thus obtained sheet or plate has a smooth surface with only slight concave and convex portions thereon. If necessary, by passing the product through cold rollers immediately after extrusion, or by passing it through hot rollers after it has cooled a product with overall smooth surfaces can be obtained.

Thermoplastic synthetic resins suitable in the present invention are the polyolefins, such as polyethylene, polypropylene and polyvinylchloride, and co-polymers of polymerizable vinyl-type monomers therewith, or blends of such polymers as mentioned above.

The foamable thermoplastic synthetic resins to be used are, therefore, those which can expand when entering the low pressure zone through the die from the extruder. Said compositions are composed of the thermoplastic resin and a volatile organic solvent as foaming agent. This is added by injection at a suitable point in the extruder and is mixed sufficiently in the extruder. Alternately, the mixture of thermoplastic resin and volatile organic solvent or chemical foaming agent are mixed prior to extrusion.

Optionally it is possible to mix a plasticizer, a pigment, a stabilizer, a foam adjusting agent, etc., along with the foamable thermoplastic synthetic resin.

Materials suitable as foaming agents and which can produce gas through the thermal decomposition or chemical reaction under appropriate conditions are, for example, azodicarbonamide, benzene sulfohydrazide, diazoaminobenzene, and N,N'-dinitro-sopentamethylene tetramine.

Suitable volatile organic solvents are, for example, chloro-fluoroethane, dichlorodifluoroethane, monochlorotrifluoroethane, propane, butane, pentane, dimethylether, diethyether and equivalents.

A molten, foamable thermoplastic synthetic resin composition, melted within the extruder 1, is sent into the die 2 by the rotation of the screw 3 through the opening 4, and when it is extruded into the low pressure zone through the slit 5 provided on the die, most of the extruded matter is collected into the concave region $c$.

Most of the expansion of the extruded matter is brought about in the region very close to the die lip, and the resin composition extruded into the concave region $c$ is expanded mostly in said concave region.

Foaming is carried out in such a manner that expansion is done equally in all directions, but since there is the side $d$, the transversal expansion is restricted, and the extruded matter is expanded in the longitudinal direction and in depth so that the thickness of the extrudate from the concave region or portion of said die is considerably increased.

When the spacing of the convex region $b$ is adjusted to a suitable size, the expansion is not terminated within the concave region alone, but is continued even out of said concave portion, the extruded matter overflowing from the neighboring concave portions and the foams becoming respectively melt-adhered. The resulting sheet or plate shows a united surface.

The thus obtained foamed product is smooth-surfaced, although slightly concave or convex. It is possible, therefore, if so desired, to have the extruded product passed through cold rollers soon after the extrusion, or through hot rollers after it has cooled. This procedure will result in a foamed product with smooth surfaces.

The slit clearance a is determined by the extrusion capacity of the extruder, the width of slit and the size of the foamed product desired and is, preferably, about 3 mm, or more preferably from 0.3 to 1 mm.

The slit clearance a can be the same throughout the whole slit, or it can be different. For example, when the slit clearance at the region where the surface is short (the concave portion) is slightly larger than the portion where the surface is longer (the convex portion), the thickness of the foamed product can be increased.

As to the concave region or portion $c$, the convex region or portion $b$ and the size of the concave spacing, provided on the die, are changed in accordance with such factors as the extrusion capacity of the extruder, the clearance of the slit a, the width of the slit $a$, the thickness of the desired foamed product, the degree of expansion and the size of the foam. However, the length of the projection, i.e., the convex portion, is preferably from 1 to 5 mm, the width of the convex portion is from 1 to 3 mm, and the width of the concave portion is also from 1 to 3 mm.

When the concave spacing is made deeper or the degree of concavity and convexity are increased, the thickness of the foamed product can also be increased.

The following are illustrative examples to further appreciate the present invention.

EXAMPLE 1

0.1 parts of an equimolar mixture of mono-sodium citrate and sodium bicarbonate as foam adjusting agents was blended with 100 parts of polypropylene, specific gravity 0.91, and the blended mixture was fed to an extruder.

Figure 2:
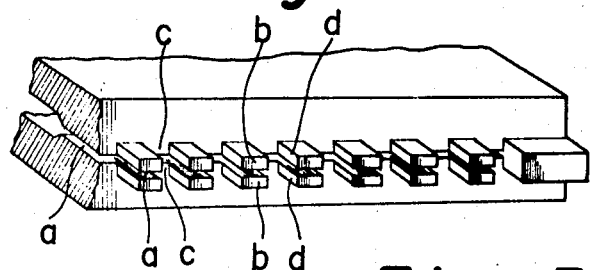
FIGS. 2, 3 and 4 are enlarged perspective views of the embodiments of the die of this invention.

Thereafter, 17 parts of pressurized butane (n-to iso- = 7:3) were fed into the extruder through small holes bored in the extruder cylinder and mixed with the polypropylene. The extruder was provided with a die having the structure shown in FIG. 2.

The mixture was extruded into a lower pressure zone and a foamed product was obtained.

The structure of the die which was used in this example was as follows: slit clearance a 0.4 mm; full width of the slit 80 cm; width of one concave portion c 2.5 mm; length of the convex portion 2.5 mm; width of the convex portion b 2.5 mm; thickness of the concave and convex portions 6 mm; number of concave portions 160; convex portions provided on the entire width of the slit 159; length of the slit surface at the convex portion 8.5 mm; length of the surface at the concave portion 6.5 mm.

The region near the end of the extruder 1 was adjusted to 160° C; the region near the outlet of the slit a of the die 2 was kept at 152° C; and the composition was extruded at the rate of 50 kg/hr by rotating the screw 3.

The extruded matter expanded considerably in the vicinity of the slit when it passed thereby and the expanded foam masses of the adjacent region c were melt-adhered to one another during expansion, so that a thick sheet of polypropylene foamed product with a united surface was obtained. The foamed product was cooled by passing it through a water bath and was then taken up.

The thickness of the foamed sheet was about 10 mm, its width was 83 cm, and its specific gravity was 0.026.

In addition, the foamed product was passed through 150° C hot rollers, so that any concave and convex surfaces were smoothed and sheets of foam were obtained having a 9 mm thickness.

EXAMPLE 2

100 parts of polystyrene were mixed with 2 parts of azobisisobutylonitrile, and the obtained mixture was fed to an extruder.

Figure 3:
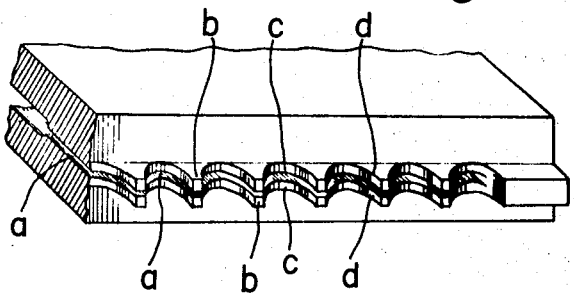

Then 7 parts of pressurized butane (n-: iso- = 7:3) were fed into the extruder in the same manner as in Example 1, and the composition was extruded through a die having the structure shown in FIG. 3, into the lower pressure zone and the foamed product was obtained.

The die used in this example had the following characteristics: slit clearance 0.7 mm; full width of the slit 80 cm; width of one concave portion 3 mm; length of the convex portion 3 mm; width of the convex portion 2 mm; thickness of the concave and convex portions 7 mm; number of concave portions 150; number of convex portions 149; length of the surface of the slit at the convex portion 8.5 mm; length of the surface at the concave portion 6.5 mm.

The screw was rotated while maintaining the region near the outlet of the slit of the die at a temperature of from 100° C to 110° C, and the region near the end of the extruder at a temperature of 135° C. The extrusion was carried out at a rate of 48 kg/hr.

When the extruded matter exited from the slit, it was considerably expanded in the nearby region and in the process of expansion, it was extruded from the neighboring concave portions and the expanded foams were melt-adhered to one another, and the surface was united.

The thus obtained foamed product was cut into lengths of 2 m.

The thickness of the foamed product was about 9 mm, its width was 82 cm, and its specific gravity was 0.040. The product was of uniform quality.

The foamed product was passed through hot rollers kept at 140° C, so that all slightly concave and convex portions were eliminated, and the surfaces became smooth. The smoothed sheets of foamed product had a thickness of about 8.5 mm.

EXAMPLE 3

0.1 parts of an equimolar mixture of monosodium citrate and sodium bicarbonate, as foam adjusting agent, was mixed with 100 parts of polystyrene, specific gravity 1.05, and the obtained mixture was fed to an extruder.

Figure 4:
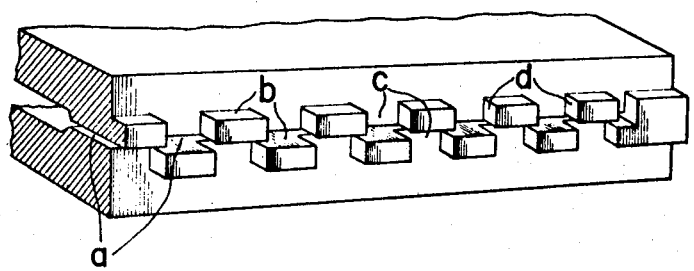
Figure 5:
FIGS. 5 and 6 are the enlarged vertical cross-sectional views of the foamed product obtained in accordance with the method of this invention.
Figure 6:

7.5 parts of butane were added to the above mixture in the extruder to prepare the required molten composition. The die of the extruder had the structure shown in FIG. 4.

The molten composition was extruded into the low pressure zone, and a foamed product was obtained.

The die which was used in this example had the following characteristics:

Slit clearance 0.4 mm; full width of the slit 90 cm; length of the convex portion of the lip 2 mm; the lip concave and convex portions were alternatively provided every 2.5 mm in the transverse direction of the slit.

The resin composition was extruded at the rate of 48 kg/hr by rotating the screw while keeping the region near the end of the extruder at 135° C, and the outlet portion of the slit of the die at 110° C.

The extruded product was considerably expanded in the neighborhood of the slit when it passed through the slit. During the process of expansion, the foams extruded from the neighboring concave portions were melt-adhered to one another and their surfaces were united. Polystyrene foamed product with a thickness of about 10 mm, a width of about 95 cm, and a density of 0.038 was obtained.

What is claimed is:

1. An extruder for producing sheet-like products, said extruder comprising a screw for advancing a molten, foamable, thermoplastic resin, a die for receiving the resin fed by said screw, said die having an outer face and a continuous slit therein for defining a rectangular extrusion orifice, the width and length dimensions of said orifice being substantially the same as the resulting sheet-like products and two rows of separated projections extending from said outer face of said die, said projections in one of said rows being laterally spaced apart from each other along said outer die face adjacent one longitudinal dimension of said orifice, said projections in said other row being laterally spaced apart from each other along said outer die face adjacent the other longitudinal dimension of said orifice, each said projection being defined by a pair of side walls, an end wall spaced from said orifice and top and bottom facing walls, the top facing walls of one of said rows of projections and the bottom facing walls opposed thereto of said other row of projections defining therebetween a direct continuation of said orifice for controlling and maintaining substantially uniform the thickness dimension of the resulting, extruded, sheet-like product at a point downstream of said orifice and said end walls.

2. The extruder in accordance with claim 1, wherein said projections of one of said rows are in direct opposition to said projections in said other row.

3. The extruder in accordance with claim 1, wherein said projections of one of said rows are laterally offset with respect to the projections in said other row.

4. The extruder in accordance with claim 1, wherein said side walls of said projections are straight.

5. The extruder in accordance with claim 1, wherein said side walls of said projections are arcuate.

6. The extruder in accordance with claim 1, wherein the width of said projections proximate said end walls thereof is smaller than the width of said projections adjacent said orifice.

* * * * *